United States Patent
Hammond et al.

(10) Patent No.: US 9,272,260 B2
(45) Date of Patent: Mar. 1, 2016

(54) METHODS OF SYNTHESIS AND PURIFICATION BY USE OF A SOLID SUPPORT

(75) Inventors: Gerald B. Hammond, Louisville, KY (US); Bo Xu, Louisville, KY (US)

(73) Assignee: UNIVERSITY OF LOUISVILLE RESEARCH FOUNDATION, INC., Louisville, KY (US)

( * ) Notice: Subject to any disclaimer, the term of this patent is extended or adjusted under 35 U.S.C. 154(b) by 847 days.

(21) Appl. No.: 12/852,763

(22) Filed: Aug. 9, 2010

(65) Prior Publication Data
US 2011/0077393 A1 Mar. 31, 2011

Related U.S. Application Data

(60) Provisional application No. 61/234,005, filed on Aug. 14, 2009.

(51) Int. Cl.
*B01J 20/26* (2006.01)
*B01J 20/10* (2006.01)
*B01J 20/283* (2006.01)
*B01D 15/20* (2006.01)

(52) U.S. Cl.
CPC ............... *B01J 20/26* (2013.01); *B01J 20/103* (2013.01); *B01J 20/283* (2013.01); *B01D 15/20* (2013.01)

(58) Field of Classification Search
CPC ........ B01J 20/283; B01J 20/26; B01J 20/103; B01D 15/20
USPC ..................... 210/635, 656, 659, 198.2, 502.1
See application file for complete search history.

(56) References Cited

U.S. PATENT DOCUMENTS

| | | | |
|---|---|---|---|
| 4,230,679 A | 10/1980 | Mahler et al. | |
| 4,415,631 A * | 11/1983 | Schutijser | 428/405 |
| 4,592,842 A * | 6/1986 | Tomlinson | 210/659 |
| 5,651,883 A * | 7/1997 | Horwitz et al. | 210/198.2 |
| 5,772,875 A * | 6/1998 | Pettersson et al. | 210/198.2 |
| 6,020,203 A * | 2/2000 | Rexroad et al. | 436/67 |
| 6,071,410 A * | 6/2000 | Nau et al. | 210/635 |
| 6,136,960 A * | 10/2000 | Chait et al. | 530/412 |
| 6,290,853 B1 * | 9/2001 | Allmer et al. | 210/635 |
| 6,803,200 B2 * | 10/2004 | Xia et al. | 435/6.12 |
| 7,192,525 B2 * | 3/2007 | Fisk et al. | 210/635 |
| 7,311,825 B2 | 12/2007 | Shah | |
| 7,917,250 B2 * | 3/2011 | Pensak et al. | 700/285 |
| 7,943,046 B2 * | 5/2011 | Martosella et al. | 210/635 |
| 2003/0232978 A1 | 12/2003 | Seeberger et al. | |
| 2005/0029195 A1 * | 2/2005 | Gibson et al. | 210/656 |

(Continued)

OTHER PUBLICATIONS

Snyder (Introduction to Modern Liquid Chromatograph, John Wiley & Sons, New York, 1979, pp. 298-301).*

(Continued)

*Primary Examiner* — Ernest G Therkorn
(74) *Attorney, Agent, or Firm* — Calfee, Halter & Griswold LLP; Harry J. Guttman

(57) ABSTRACT

Disclosed herein are novel methods of using polymeric adsorbent resin for chemical synthesis and the purification of product therefrom. Also disclosed herein is a novel method of using silica gel for the combination of chemical reaction and chromatography into a single step. The methods disclosed herein increase the efficiency of chemical synthesis processes. Accordingly, the utility of the methods disclosed herein includes the ability to automate chemical synthesis and purification of the resulting products.

22 Claims, 12 Drawing Sheets

(56) References Cited

U.S. PATENT DOCUMENTS

| | | | |
|---|---|---|---|
| 2005/0133424 A1 | 6/2005 | Bouvier et al. | |
| 2005/0277741 A1* | 12/2005 | Kallury et al. | 525/333.3 |
| 2006/0131238 A1* | 6/2006 | Xu | 210/656 |
| 2007/0140983 A1 | 6/2007 | Hall et al. | |

OTHER PUBLICATIONS

PCT/US10/45007, International Search Report, mailed Sep. 24, 2010, 3 pp.
PCT/US10/45007 Written Opinion, mailed Sep. 24, 2010, 5 pp.
Aponte et al., "Synthesis, Cytotoxicity, and Anti-Trypanosoma cruzi Activity of New Chalcones" J. Med. Chem. (2008) vol. 51, pp. 6230-6234.
Atrash et al., "Revolutionizing Resin Handling for Combinatorial Synthesis" Angew. Chem. Int. Ed. (2001) vol. 40, No. 5, pp. 938-941.
Benaglia, Recoverable and Recyclable Catalysts, Chapters 1-15 (2009) Wiley, Great Britain.
Bergbreiter et al., "Introduction to Facilitated Synthesis" Chemical Reviews (2009a) vol. 109, No. 2, pp. 257-258.
Bergbreiter et al., "Using Soluble Polymer Supports to Facilitate Homogeneous Catalysis" Chemical Reviews (2009b) vol. 109, No. 2, pp. 530-582.
Bogdan et al., "Improving Solid-Supported Catalyst Productivity by Using Simplified Packed-Bed Microreactors" Angew. Chem. Int. Ed. (2007) vol. 46, pp. 1698-1701.
Bouillon et al., "Resin Capsules: Permeable Containers for Parallel/Combinatorial Solid-Phase Organic Synthesis" J. Comb. Chem. (2008) vol. 10, pp. 714-720.
Breitenbucher et al., "Scope and Limitations of Solid-Supported Liquid-Liquid Extraction for the High-Throughput Purification of Compound Libraries" J. Comb. Chem. (2001) vol. 3, pp. 528-533.
Buchmeiser et al., "Polymer-Supported Well-Defined Metathesis Catalysts" Chem. Rev. (2009) vol. 109, No. 2, pp. 303-321.
Chanda et al., "Organic Synthesis 'On Water'" Chem. Rev. (2009) vol. 109, No. 2, pp. 725-748.
Cork et al., "Work-up strategies for high-throughput solution synthesis" Drug Discovery Today (Jan. 2002) vol. 7, No. 1, pp. 56-63.
Corma et al., "Supported gold nanoparticles as catalysts for organic reactions" Chem. Soc. Rev. (2008) vol. 37, pp. 2096-2126.
Danishefsky et al., "Total Synthesis of Baccatin III and Taxol", J. Am. Chem. Soc. (1996) vol. 118, pp. 2843-2859.
De Korompay et al., "Supported liquid-liquid extraction of the active ingredient (3,4-methylenedioxymethylamphetamine) from ecstasy tablets for isotopic analysis" J. Chromatogr. A (2008) vol. 1178, pp. 1-8.
Fraile et al., "Noncovalent Immobilization of Enantioselective Catalysts" Chem. Rev. (2009) vol. 109, No. 2, pp. 360-417.
Glaspell et al., "Nanocatalysis on Tailored Shape Supports: Au and Pd Nanoparticles Supported on MgO Nanocubes and ZnO Nanobelts" J. Phys. Chem. B (2006) vol. 110, No. 43, pp. 21387-21393.
Horváth et al., "Facile Catalyst Separation Without Water: Fluorous Biphase Hydroformylation of Olefins" Science (Oct. 7, 1994) vol. 266, pp. 72-75.
Hughes et al., "Tunable gold catalysts for selective hydrocarbon oxidation under mild conditions" Nature (Oct. 20, 2005) vol. 437, pp. 1132-1135.
Hüser, High-Throughput Screening in Drug Discovery, Chapter 9 (2006) Wiley-VCH, Weinheim.
Johnson et al., "Libraries of N-Alkylaminoheterocycles from Nucleophilic Aromatic Substitution with Purification by Solid Supported Liquid Extraction" Tetrahedron (1998) vol. 54, pp. 4097-4106.
Kerton, Alternative Solvents for Green Chemistry, Chapter 1 (2009) RSC Publishing, Cambridge, UK.
Kobe et al., Structural Proteomics: High-Throughput Methods, Preface (2008) Humana Press, Totowa New Jersey, USA.
Koc et al., "Catalysts on Functionalized Polymer Chips (PC) as Recyclable Entities" Synthesis-Stuttgart (2005) No. 19, pp. 3362-3372.
Lu et al., "Organic Polymer Supports for Synthesis and for Reagent and Catalyst Immobilization" Chem. Rev. (2009) vol. 109, No. 2, pp. 815-838.
Luo et al., "Fluorous Mixture Synthesis: A Fluorous-Tagging Strategy for the Synthesis and Separation of Mixtures of Organic Compounds" Science (Mar. 2, 2001) vol. 291, pp. 1766-1769.
Malhotra, ACS Symposium Series 950—Ionic Liquids in Organic Synthesis, Chapters 1 and 11 (2007) American Chemical Society, Division of Organic Chemistry, Distributed by Oxford University Press, Washington, DC.
McDonald et al., A Sample Preparation Primer and Guide to Solid Phase Extraction Methods and Development, pp. 1-83 (2001) Millipore Corporation Waters Chromatography Division, Waters, Milford, MA, USA.
Minakata et al., "Organic Reactions on Silica in Water" Chem. Rev. (2009) vol. 109, No. 2, pp. 711-724.
Miyashita et al., "Total Synthesis of Norzoanthamine" Science (Jul. 23, 2004) vol. 305, pp. 495-499.
Najman et al., "Entangled palladium nanoparticles in resin plugs" Chem. Commun. (2007) Issue 47, pp. 5031-5033.
Nave et al., "Use of solid-supported liquid-liquid extraction in the analysis of polyphenols in wine" Journal of Chromatography A (2007) vol. 1169, pp. 23-30.
Schreiber, "Target-Oriented and Diversity-Oriented Organic Synthesis in Drug Discovery" Science (Mar. 17, 2000) vol. 287, pp. 1964-1969.
Seethala et al., Handbook of Drug Screening, 2nd ed., Chapters 1 and 2 (2009) Informa Healthcare USA, New York.
Shaughnessy, "Hydrophilic Ligands and their Application in Aqueous-Phase Metal-Catalyzed Reactions" Chem. Rev. (2009) vol. 109, No. 2, pp. 643-710.
Simpson, Solid-Phase Extraction: Principles, Techniques, and Applications, Chapters 1, 2, 4, Appendix 1, and Appendix 2 (2000) Marcel Dekker, New York.
Studer et al., "Fluorous Synthesis: A Fluorous-Phase Strategy for Improving Separation Efficiency in Organic Synthesis" Science (Feb. 7, 1997) vol. 275, pp. 823-826.
Sun et al., "Au- and Pt-Catalyzed Cycloisomerizations of 1,5-Enynes to Cyclohexadienes with a Broad Alkyne Scope" J. Am. Chem. Soc. (2006) vol. 128, pp. 9705-9710.
Thomas, Practical Guide to ICP-MS, Chapters 1-21 (2004) Marcel Dekker, New York, NY.
Thomas, Practical Guide to ICP-MS: A Tutorial for Beginners, 2nd ed., Preface (2008) CRC Press, Boca Raton.
Trindade et al., "Recyclable Stereoselective Catalysts" Chem. Rev. (2009) vol. 109, No. 2, pp. 418-514.
Turner et al., "Selective oxidation with dioxygen by gold nanoparticle catalysts derived from 55-atom clusters" Nature (2008) vol. 454, pp. 981-983 (plus Methods page).
Wang, High-Throughput Analysis in the Pharmaceutical Industry, Chapters 1 and 10 (2009) CRC Press, Boca Raton.
Wang et al., "Self-Supported Catalysts" Chem. Rev. (2009) vol. 109, No. 2, pp. 322-359.
McDonald et al., Solid Phase Extraction, Application Guide and Bibliography—a resource for sample preparation methods development, 6th edition, pp. 32-58 (1995) Waters, Milford, MA, USA.
Wender et al. "Function-Oriented Synthesis, Step Economy, and Drug Design" Accounts of Chemical Research (Jan. 2008) vol. 41, No. 1, pp. 40-49.

* cited by examiner

| Resin | Matrix | Supplier | PORE DIAM, AVE (Angstroms). | PORE VOL. (mL/g) | WEST MESH SIZE (nominal) | Retail price[a] US $/g |
|---|---|---|---|---|---|---|
| XAD-4 | Polyaromatic | Rohm Haas | 50 | 0.98 | 20-60 | 0.17 |
| XAD-7 | Polyacrylic ester | Rohm Haas | 100 | 1.14 | 20-60 | 0.12 |
| XAD-16 | Polyaromatic | Rohm Haas | 90 | 1.82 | 20-60 | 0.20 |
| HS20-SS | Polyaromatic | Misubishi | 260 | 1.30 | 75-150 μm | 0.62 |
| L-493 | Polyaromatic | Dow | 46 | 1.16 | 20-50 | 0.13 |
| A-26 | Polyaromatic/ -$R_3N^+OH^-$ | NA | 400 A | 0.40 | NA | NA |
| P-1 | Polyaromatic | NA | ~100 μm | ~ 20.0 | NA | NA |
| P-2 | Polyaromatic | NA | ~100 μm | ~ 10.0 | NA | NA |
| P-3 | Polyaromatic | NA | ~100 μm | ~ 10.0 | NA | NA |

[a] Price from Aldrich/Supelco catalog.

Figure 2

| Test compound /solvent | THF | EtOH | Toluene | CH$_3$CN | CH$_2$Cl$_2$ | DMF |
|---|---|---|---|---|---|---|
| 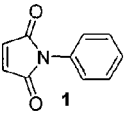 1 | 99% | 99% | 92% | 99% | 95% | 99% |
| 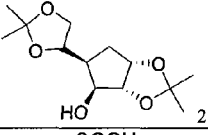 2 | 99% | 99% | 95% | 99% | 98% | 98% |
| 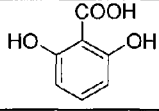 3 | 99% | 95% | 97% | 98% | 98% | 85% |
|  4 | 99% | 100% | 100% | 100% | 99% | 99% |
| 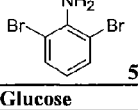 5 | >99% | 99% | 99% | 98% | 99% | 95% |
| Glucose | <1% | <1% | <1% | <1% | <1% | <1% |
Figure 4

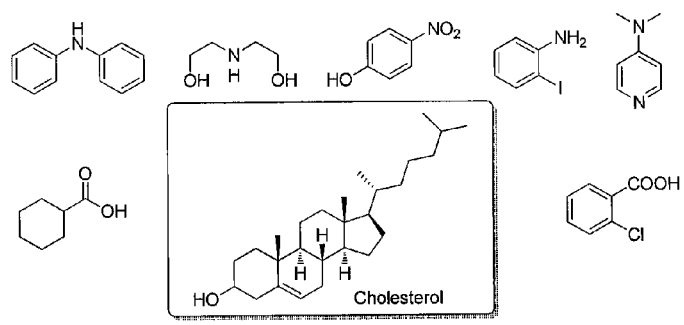
a) before separation
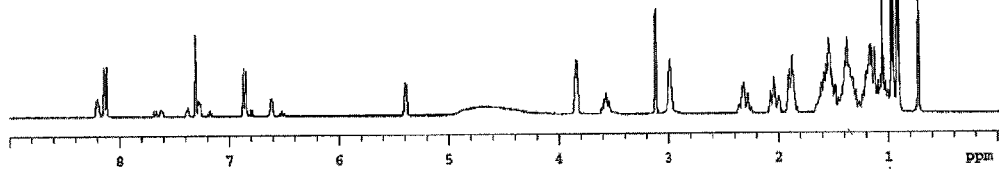
b) after separation
Figure 6

1. Intermolecular reactions

Diels-Alder Reactions e.g.
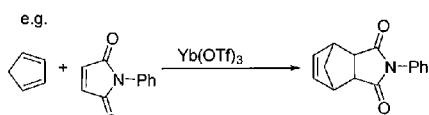

1,3-Dipolar cycloadditions e.g.
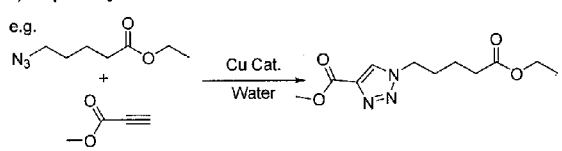

Cross-coupling reaction

ArM + RX ⟶ Ar-R e.g. Suzuki reaction
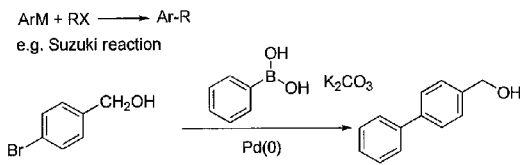

Nucleophilic Opening of Three-Membered Rings e.g.
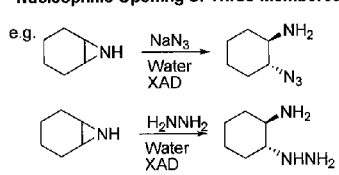

Nucleophilic Substitution Reactions

RX $\xrightarrow{Nu}$ RNu e.g.
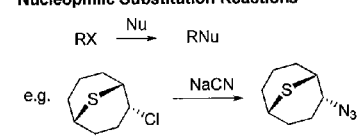

Metal catalyzed addition e.g.
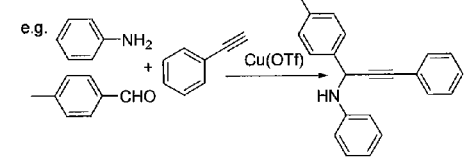

2. Intramolecular reaction

Claisen rearrangements e.g.
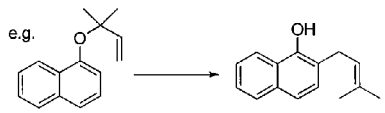

Metal catalyzed cyclizations e.g.
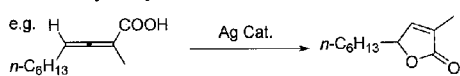

Metal catalyzed cycloisomerizations e.g.
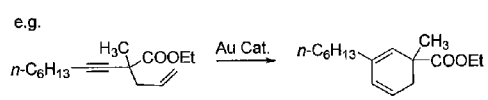

Metal catalyzed cycloisomerizations e.g.
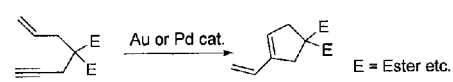

E = Ester etc.

METHODS OF SYNTHESIS AND PURIFICATION BY USE OF A SOLID SUPPORT

This application claims the benefit of U.S. Provisional Patent Application Ser. No. 61/234,005, filed Aug. 14, 2009, entitled "Methods of Synthesis and Purification by Use of a Solid Support" which is hereby incorporated by reference in its entirety.

Be it known that we, Gerald B. Hammond, a citizen of the United States, residing at 1113 Rostrevor Circle, Louisville, Ky. 40205, and Bo Xu, a citizen of China, residing at 779 Theodore Burnett Court, Apt. 4, Louisville, Ky. 40217, have invented new and useful "Methods of Synthesis and Purification by Use of a Solid Support".

SUMMARY OF INVENTION

The present invention discloses methods of catalyzing chemical reactions, chemical synthesis, and the purification of products therefrom. Disclosed herein are methods of using polymeric adsorbents for these purposes. The methods disclosed herein increase the efficiency of traditional chemical synthesis processes. In certain embodiments, the method of purifying a product from a chemical reaction includes providing a polymeric adsorbent resin in a capsule/caplet, column, plug or free form, mixing the resin in a reaction mixture of aqueous solution and organic solvent, adding a reagent in a water solution to remove unwanted by-products, and adding a solvent, such as acetone, methanol, or the like, to dislodge the product from the resin. In certain embodiments, the resin is a polymer having a pore volume of more than 5 ml/g. In other embodiments, the resin is a polymer having a pore volume of from about 1.8 ml/g to about 25 ml/g. In certain embodiments, the method of synthesis includes, providing a resin in a reaction mixture, providing a first chemical and a second chemical to the reaction mixture, and adding water to the reaction mixture as a solvent, wherein the organic reaction takes place within the internal structure of the resin. In certain embodiments, a method of catalyzing a reaction by use of a resin, includes providing a polymeric adsorbent resin, mixing the polymeric adsorbent resin with a catalyst and a reaction mixture, and adding a reagent in a water solution to remove unwanted by-products. In certain embodiments, the catalyst contains metal, palladium, platinum, or the like. In another embodiment, a method of using silica gel includes providing a silica gel, immobilizing a catalyst or reagent in combination with the silica gel, packing the silica gel into a column, reacting the catalyst or reagent attached to the silica gel with another chemical entity that is presented on the column. Accordingly, the silica gel allows for the chemical reaction and chromatography to occur on a single column. In yet another embodiment, the invention is a method of performing a chemical reaction and chromatographic separation in a reaction mixture, including, providing a resin, providing a solid support having a catalyst, providing a reaction mixture, placing the resin and the reaction mixture in contact with the solid support so that a chemical reaction occurs in order to product a desired product, separating the desired product by chromatographic separation at the same time as the occurrence of the chemical reaction. In certain embodiments, the solid support is silica gel. In other embodiments, the resin has a pore volume of more than 5 ml/g. In still other embodiments, the catalyst is a metal containing catalyst. The present invention is a method of synthesizing a polymer material, including, mixing a styrene, divinylbenzene, and surfactant, then adding water, and a water soluble initiator, then adding $CaCl_2$, incubating at 60° C. for about 48 hours, recovering the monolith, extracting with propan-2-ol, and drying in a vacuum. In certain embodiments, the water soluble initiator is potassium persulfate.

The methods disclosed herein allow for any chemical entity which is combined with the resin to be used in a subsequent chemical reaction. That is, collecting resin from a first reaction and placing it in the next chemical reaction environment. Further, resin containing certain chemical entities may be reused, thus reducing the amount of chemical waste being produced during the steps of chemical synthesis and purification.

BRIEF DESCRIPTION OF THE DRAWINGS

FIG. 2 is a table of the physical properties of selected resins. Such information being available from the manufacture's product manuals, if commercially available.

FIG. 4 is a table showing the percentage of recovery of known amounts of compounds 1-5 and glucose, as further described in the specification.

FIG. 6 is a schematic diagram showing NMR spectra of the product before separation and after separation by use of an embodiment of the present invention. Shown in (a) is an $^1$H-NMR of the mixture of cholesterol and various acids and bases. Shown in (b) is an $^1$H-NMR of product after separation. The structure in the box (cholesterol) is the target compound.

FIG. 9 is a list of exemplary reactions that may be facilitated by the invention disclosed herein.

EMBODIMENTS OF THE INVENTION

Figure 1:
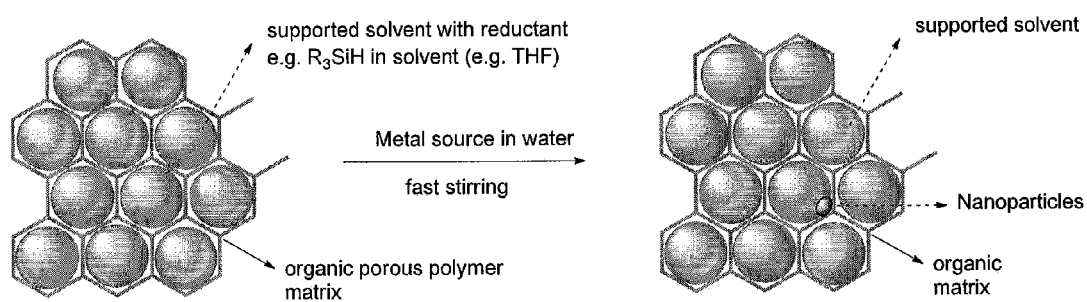
FIG. 1 is a schematic drawing of a porous polymer bead.

Disclosed herein are novel and unique methods of using polymeric adsorbents. The use of polymeric adsorbents, as disclosed herein, includes the purification of chemical entities, the presentation of a micro-environment in which chemical reactions occur, and catalyzing chemical reactions. Also disclosed herein is a method of using silica gel for mediating the reaction/purification and catalysis in situ. That is, the merging of a chemical reaction step and chromatography step into a single step.

The pharmaceutical industry relies heavily on chemical synthesis due to its central role in enabling drug discovery—the screening of small lead molecules for their ability to bind to a preselected target—and the actual drug manufacturing process. As such it is a critical component of this industry but also its bottleneck. The process of running a reaction to obtain the desired product is a labor intensive and time-consuming practice. In addition to their low efficiency, chemical syntheses can be—more often than not—hazardous procedures that use, for the most part, toxic or non-recyclable reagents/catalysts and solvents.

The present invention discloses ways to speed-up or eliminate time/labor-consuming practices in chemical synthesis (namely reaction work-up/chromatographic purification) using green solvents (water, ethanol, etc.), and recyclable catalysts. The reaction work-up (including quenching, liquid-liquid extraction and isolation) usually is the most labor and time-consuming step in a chemical synthesis. As disclosed herein, a porous polymer supported phase (a 'rigid solvent' phase) may be used to extract the organic product from the aqueous mixture. The disclosed technology differs from traditional liquid-liquid extraction in that a 'rigid solvent' (resin) is used to extract the desire product rather than a traditional 'liquid solvent' (e.g. diethyl ether).

The porous polymer supported organic phase or 'rigid solvent' phase can be regarded as a compartmentalized microreactor. The idea is very simple; using water—the ideal green solvent—as the main reaction media, most organic reagents and substrates will dissolve in the porous supported organic phase ('rigid solvent') and the reaction itself will take place inside the so called supported organic phase. Because most reactions will occur inside the polymer support/bead, each bead will act as a microreactor. Metal nanoparticle catalysts can also be generated inside this microreactor that resembles a honeycomb (the organic porous polymer). The 'rigid solvent' surrounding the metal nanoparticles will enhance their stability and make them less prone to aggregation under harsh reaction conditions.

A slightly different strategy to improve the efficiency of chemical synthesis is to combine reaction and chromatographic purification into a single step. The basic idea is to immobilize catalysts/reagents in a chromatographic silica gel-like stationary phase using non-covalent adsorption. As the starting material elutes through the supported silica the reaction and purification steps occur simultaneously. The sum total of the invention disclosed herein will reduce a large fraction of the labor/time involved in running reactions and will bring automation a step closer.

Some of the chemical agents, test compounds, resin, and the like are readily commercially available. Figures, drawings, data tables, and the like are disclosed and further described in the remainder of this specification. The use of polymeric adsorbents allows for the highly porous structures having internal surfaces to present a micro-reactor in which chemical synthesis may occur. In certain embodiments, the resin may be XAD4, XAD7, or XAD 16, as further described herein. Some resins are commercially available from Aldrich, in St. Louis, MO, as catalog number XAD4-500G, XAD7-500G, or XAD16-500G, respectively. Accordingly, being able to capture and collect such polymeric adsorbent resin is one aspect of the methodology set forth herein. Collection of such resin may occur by simple filtration, as is well known in the art. Alternatively, such resin may be placed within a column, so that various chemicals are presented to the resin as they flow through the column. Yet another alternative is to place the resin in a capsule, caplet, or samplet, such that the openings in the capsule/caplet are sufficient to allow a reaction mixture to be exposed to the resin without the resin escaping from the capsule. Whether the resin is captured within a column or capsule, it has been readily isolated. Some columns, capsules, and samplets are well known in the art.

I. Method of Purification

In certain embodiments of the present invention, the resin has an affinity for a product which is being purified. In order to remove unwanted by-products, the resin may be washed with pure water or a reagent in a water solution. Examples of such solutions include, but are not limited to, Acidic aqueous solutions (diluted HCl, $H_2SO_4$, $H_3PO_4$ etc), basic aqueous solutions (NaOH, $K_2CO_3$, etc.), $NaHSO_3$ aqueous solution, reducing aqueous reagents like $Na_2SO_3$ solution, water soluble chelation reagents, and the like, as further described herein.

In certain embodiments, the present invention is a method of using a porous polymer supported organic phase as a 'rigid solvent' that eliminates tedious liquid-liquid extraction practices and provides a universal reaction work-up protocol. This 'rigid solvent' can turn each polymer bead into a honeycomb-like microreactor (the organic porous polymer) and coax a reaction to occur inside the pores when water is present.

The centerpiece of drug discovery is finding hit-to-lead small molecules using the tools of biology. Chemical synthesis is the tool that provides the leads. As such it plays a critical role in drug discovery. Many complex bioactive molecules can now be delivered by chemical synthesis. Despite the obvious achievements of chemical synthesis in recent times, it is not without its problems. First of all, chemical synthesis is a labor intensive and time consuming practice. In contrast, high-throughput screening (HTS) allows a researcher to quickly conduct millions of biochemical, genetic or pharmacological tests. Through HTS one can rapidly identify active compounds from a chemical library containing tens of thousands of compounds. Chemical synthesis as we now know it cannot keep pace with HTS. This problem is solved by the current invention. In addition to low efficiency, chemical syntheses can be hazardous processes that often use toxic, non-recyclable reagents/catalysts and solvents. The rising costs of raw materials, ever more stringent waste disposal regulations, and excessive reliance on solvents are problems that require urgent solutions.

The everyday bottleneck in a chemical synthesis (especially parallel synthesis) is the work-up and purification of the reaction products. In comparison, carrying out the reaction itself is a relative fast process. By way of background, in a solution phase chemical synthesis, the work-up process is often necessary. After the reaction is complete, the crude mixture is quenched by a suitable aqueous solution (e.g. saturated $NH_4Cl$ solution) to neutralize the reactive reactant or intermediate and dissolve water soluble by-products. Then the reaction mixture is extracted with organic solvents (e.g. diethyl ether or ethyl acetate) in iterative fashion, and the combined organic layers are washed with an aqueous solution to remove inorganic by-products. Next, the organic phase is dried using drying agents and the solvents are removed. More often than not, there may be some by-products or unreacted starting material in the crude product. If this is the case, the crude product has to be purified using a suitable chromatographic method to furnish the pure product. These sequences are time consumin. From the above description of a typical synthetic procedure, at least the following limitations are apparent: (1) the whole process, especially liquid-liquid extraction (LLE) and washing, is tedious and difficult to automate; (2) reaction, work-up and chromatography sequences are time consuming; (3) catalysts are often not easily reused; and (4) use of large amounts of solvents and waste production are unavoidable.

1. Universal Reaction Work-Up Protocol Using a 'Rigid Solvent' Approach.

Solid supported synthesis has a big advantage over solution phase chemistry in terms of work-up and purification processes because the target molecule is attached to the solid support, which can be recovered by simple filtration, and the by-products can be washed away. The following problems are associated with currently known solid supported synthesis: higher cost, disfavored reaction kinetics and limited scope compared to solution phase chemistry. Although much research has been done on high-throughput work-up, there are still no general work-up methodologies available. The present invention provides a universal and convenient work-up protocol that eliminates the liquid-liquid extraction (LLE) step.

In certain embodiments of the present invention, the method entails use of a porous polymer supported organic phase extraction (SOPE). After a chemical synthesis has been conducted, it is quenched by a suitable aqueous solution. By way of a simple analogy, performing reactions and workups is similar to a beehive where bees produce honey (a chemical reaction) in a honeycomb (solid support) and how man extracts the honey and reuses the honeycomb (the present invention disclosed herein). The porous organic solid support functions like a honeycomb, which has a regular array of inside spaces and act as a good support for organic solvent used for extraction because of the 'attraction' (polarity-based) of the honeycomb (organic polymer) to the solvent or organic substrates. After thorough mixing (stirring or sonication), the desired organic product with solvent is absorbed or extracted into the polymer supported organic phase (SOP). In other words, this supported organic phase resembles a 'rigid solvent' phase. After extraction, the solid support (honeycomb) is still in the solid form and the aqueous phase can be removed by simple filtration. The desired product can be eluted by suitable organic solvent later on. In this way, tedious liquid-liquid extraction (LLE) can be avoided and the common problem in LLE, like emulsion formation, is not a problem because separation of two liquid phases is not necessary here. Because only stirring and filtration are involved, automation is much more feasible.

The invention disclosed herein is different than other widely used analytical techniques such as solid phase extraction (SPE) and solid-supported-liquid extraction (SLE). References relevant to those technologies include Wang, P. G. *High-throughput analysis in the pharmaceutical industry*; CRC Press: Boca Raton, Fla., 2009; Simpson, N.J. K. *Solid-phase extraction: principles, techniques, and applications*; Marcel Dekker: New York, 2000; McDonald, P. D.; Bouvier, E. S. P.; Millipore Corporation. Waters Chromatography Division. *Solid phase extraction: applications guide and bibliography: a resource for sample preparation methods development*; 6th ed.; Waters: Milford, Mass., 1995; Johnson, C. R.; Zhang, B.; Fantauzzi, P.; Hocker, M.; Yager, K. M. *Libraries of N-Alkylaminoheterocycles from Nucleophilic Aromatic Substitution with Purification by Solid Supported Liquid Extraction. Tetrahedron* 1998, 54, 4097; de Korompay, A.; Hill Jenny, C.; Carter James, F.; NicDaeid, N.; Sleeman, R. *Supported liquid-liquid extraction of the active ingredient (3,4-methylenedioxymethylamphetamine) from ecstasy tablets for isotopic analysis. J Chromatogr A* 2008, 1178, 1-8; Nave, F.; Cabrita, M. J.; Teixeira da Costa, C. *Use of solid-supported liquid-liquid extraction in the analysis of polyphenols in wine. Journal of Chromatography, A* 2007, 1169, 23-30; Breitenbucher, J. G.; Arienti, K. L.; McClure, K. J. *Scope and limitations of solid-supported liquid-liquid extraction for the high-throughput purification of compound libraries. J. Comb. Chem.* 2001, 3, 528-533. In SPE, a sample containing solution (mobile phase) is passed through a solid bed (stationary phase) to separate a mixture into desired and undesired components. SLE involves supporting an aqueous buffer on a bed of calcinated diatomaceous earth (sold under the product name Hydromatrix). Then a solution of product in water-immiscible solvent passes through the diatomaceous bed. In the current invention, supported organic phase extraction (SOPE), use is made of the affinity of porous organic polymer matrix to organic solvent to extract the solvent into the solid support (formation of a 'rigid solvent'). Then, use is made of the affinity of the 'rigid solvent' to the product to extract it to the solid support. Accordingly, the present invention uses a 'rigid solvent' to extract the desired product instead of regular 'liquid solvent' (e.g. diethyl ether).

2. Choice of Porous Polymer Support

There are many types of macroporous resins commercially available at low cost (e.g. Amberlite™ XAD series (from Rohm Haas), Diaion Sepabeads series (from Misubishi Chemical) and Dowex Optipore series (from Dow chemical)). In certain embodiments, it is preferred to use a resin having a pore volume of 1.82 mL/g. Shown, for example, in FIG. 1 is a schematic drawing of the pores of a resin. Accordingly, in certain embodiments, use of the XAD-16 resin is desired. Because commercial macroporous resins are designed with other applications in mind (e.g. water or food treatments) they may not be the best for reaction work-up. Most macroporous resins are 20-40% cross-linked polystyrene or polyacrylic ester beads prepared by suspension polymerization in the presence of a porogen. Various types and size of internal structure are possible depending on the amount and type of porogen (e.g. toluene) used. In alternate embodiments, modification of the reaction conditions, such as increasing the amount of porogen, during the polymerization to get polymer beads with larger pore volume. Use of the invention disclosed herein allows for most organic compounds to be recovered in high yield, but highly polar compounds like glucose can't be extracted.

Examples of suitable rigid porous structures are shown in FIG. 2. The open texture and big pore volume allows a wide variety of solvents to enter the pores and form a supported organic phase (SOP), see FIG. 1. This supported organic phase resembles a 'rigid solvent'. As long as the desired product is not highly polar [e.g., sugars or ionic compound (salts)], it will be extracted or absorbed by the SOP. And most type of resins (like XAD-4 or XAD-16) can tolerate wide range of temperature (up to 200° C.) and pH (0-14), so this protocol will work for most organic compounds and thus can be considered universal.

In addition to commercial resin, disclosed herein is the synthesis of various poly-HIPE (high internal phase emulsion polymer), also shown in FIG. 2. Included in FIG. 2 are monolith-type polyHIPE materials. Different sizes of porous polymer particles were obtained by a standard grinder and sieve kits. Scanning electron microscope (SEM) was used to investigate pore size and distribution. As shown in the FIG. 2, the poly-HIPE polymer has much larger pores than XAD-4, and these pores are interconnected with smaller pores (windows).

A method of synthesis of P-1, P-2, and P-3 is disclosed herein. P-1 was prepared from polymerization of emulsion of DVB 5 mL/toluene 5 mL/Span-80 2 mL in 90 mL water. P-2 was prepared from polymerization of emulsion of DVB 2 mL/Styrene 8 mL/Span-80 3 mL in 90 mL water. P-3 was prepared from polymerization of emulsion of DVB 9 mL/Span-80 3 mL in 90 mL More specifically, for example, regarding the preparation of P-2, an oil phase consisting of styrene (8 mL), divinylbenzene (DVB) (2 mL) and the surfactant sorbitan monooleate (Span 80) (3 mL) was added to a 250 ml three-necked round bottomed flask. The oil phase was stirred continually at 300 rpm using a D-shaped PTFE paddle connected to an overhead stirrer. An aqueous phase consisting of 90 ml of deionised water and the water soluble initiator potassium persulfate (0.2 g) and $CaCl_2$ (1.0 g) was added over a period of 30 min until a emulsion had formed. After addition of the aqueous phase was complete, the emulsion was stirred for a further period of 10 minutes. The emulsion was then transferred to a polycarbonate centrifuge tube, which was placed in a water bath at 60° C. for 48 h. The resulting monolith was recovered from the tube then extracted in a soxhlet apparatus with propan-2-ol for 24 h and dried in vacuo. All of the starting materials are readily commercially available, such as, for example, from Aldrich or Acros.

In general, porous organic polymers can be classified under three categories. Microporous polymers are formed by cross-linking linear chains of monomer. Known as 'gels', they usually swell in solvents and mass transfer may be slow, so they may not be good candidates for rigid solvent extraction. Macroporous polymers have a higher degree of cross-linking, preventing them from swelling in solvents. Pores are larger than gels, total pore volumes are typically more than 50%. These polymers have found numerous applications in water treatment, food processing, etc. Many types of macroporous resins are commercially available at low cost (e.g. Amberlite™ XAD series from Rohm Haas, now part of Dow Chemical). Another type of porous polymer is high internal phase emulsion polymer (polyHIPE), which contain extremely large cavities that are interconnected by a series of smaller pores. These interconnections permit full penetration into interior surfaces, cavities are of micrometer dimensions, rather than angstrom dimensions of conventional polymers. Total pore volume can exceed 90%. They are highly cross-linked and therefore rigid, so they do not swell in solvents.

3. Choice of Scavenger Solutions

One significant advantage of the present invention is the convenient use of aqueous scavengers to remove unwanted by-products during the filtration process. The scavenger solution is an aqueous solution of highly polar ionic compounds, which will react with the by-product during the washing process (e.g. basic by-product can by washed away by acid solution). After the by-product has reacted, excess amounts of scavenger solution can be washed away with water. Examples of water-based scavengers include, but are limited to, the following: (1) Acidic aqueous solutions (diluted HCl, $H_2SO_4$, $H_3PO_4$ etc) for the removal of basic organic compounds (like amines, etc.); (2) Basic aqueous solutions (NaOH, $K_2CO_3$, etc.) for the removal of acidic organic compounds (like carboxylic acids, phenols, etc.); (3) $NaHSO_3$ aqueous solution for the removal of aldehydes; (4) Reducing aqueous reagents like $Na_2SO_3$ solution for the removal of oxidizing agents; and (5) Reducing aqueous reagents like $Na_2SO_3$ solution and water soluble chelation reagents for the removal of heavy metals.

In still other embodiments of the present invention, resin may be placed in and used in a cartridge. Accordingly, different sizes of porous polymer can be obtained by a standard grinder and sieves kits (wide ranges of kits are available commercially). In yet other embodiments of the present invention, such cartridges may be used in high-throughput reactions. High-throughput may be accomplished by use of a commercial filtration manifold or slightly modified version like the one from Aldrich. These are readily commercially available from many other suppliers like Waters, JB Baker, etc.

Additional uses of the present invention include use in the analysis of small molecules drugs or metabolites from biological samples like plasma. In such an embodiment, the biological sample is usually an aqueous-based solution (e.g. urine). First, small amounts of an organic solvent like ether are added, after thorough mixing (stirring or sonication), the two phase mixture is passed through a resin cartridge. Then the cartridge is washed by plenty of water, then the it is eluted with suitable organic solvent like acetone to concentrate and purified analyte, which can used for further analysis like (HPLC/MS or GC/MS).

In certain embodiments of the present invention, a method of purification includes the steps of (i) adding a suitable aqueous solution to a completed reaction to quench the reaction; (ii) extracting a polymer resin by using a water-miscible solvent, like ethanol, (iii) using vacuum filtration and then washing the resin with scavenger solution (like HCl solution to remove basic by-products). Followed by washing the resin with pure water; and (iv) eluting the resin with strong organic solvent (e.g. acetone or ethanol) to give product. Alternatively, if there are some by-product(s) which have significant polarity difference, then selective elute the resin with a gradient solvent system (e.g from 10% ethanol in water to 70% ethanol in water), to get a relative pure product in certain fractions. In alternate embodiments, in the procedure in step ii, the resin supported organic liquid can be generated in situ. That may be done by adding a small amount of extraction solvents like ethyl acetate, which has good solubility towards product, and then the resin (polymer beads) is added. During stirring the polymer supported organic liquid phase will be generated in situ. And at same time, the organic products will be trapped or absorbed by the supported organic liquid phase inside the pores. What is more important, if the solvent used in the reaction is already a good solvent for product, then no extra extract solvent is needed. In certain embodiments of the invention, (i) water solution is added to quench the reaction; (ii) a small amount of extraction solvent (EtOAc, etc.) is added and XAD beads are added; (iii) wash the scavenger solution; (iv) wash with water; and (v) elute with organic solvent under a vacuum.

Figure 3:
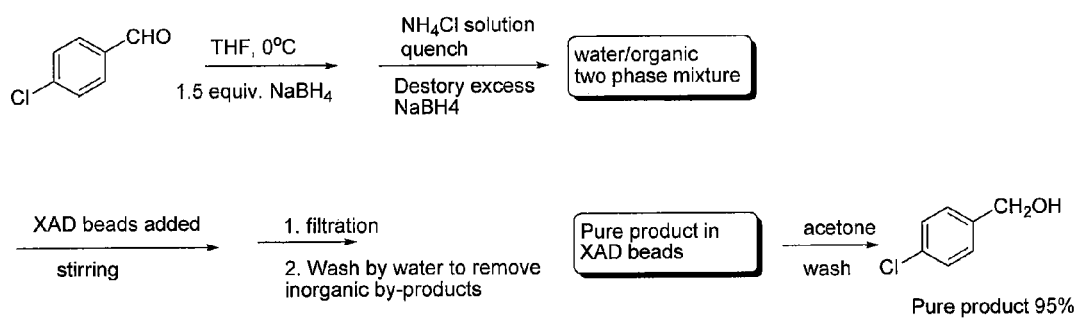
FIG. 3 is a schematic diagram of an embodiment of the present invention in a reduction reaction.

As best seen in FIG. 3, and as an example of the method disclosed herein, after the reduction of an aldehyde and such reaction is complete, it is quenched by saturated $NH_4Cl$ solution to destroy excess amount of $NaBH_4$. Because THF used in the reaction is already a good solvent for the product alcohol, no extra extraction solvent is needed. So only XAD beads are added, after stirring for 30 min, the reaction mixture is filtered, and washed with water to remove inorganic by-products. The last step is to elute the polymer beads with acetone to furnish the pure product in excellent yield (95%).

4. Recovery of Various Types of Compounds

To simulate the reaction work-up process, we used a mixture of known amounts of test compounds dissolved in various solvents, to which a NaCl solution (brine) was added ('quench' of reaction). Then the mixture was extracted from the resin to recover the test compounds. Test compounds were chosen so that they would have the typical functional groups and carbon skeletons of common organic compounds. The procedure is as follows:

Test compound (80 mg) was dissolved in 1 mL organic solvent and 4 mL 20% NaCl solution (this is a simulation of the reaction mixture after quench) was added with stirring; then 2 g XAD-4 resin was added. After stirring for 20 minutes, the mixture was filtered and washed with water (ca. 30 mL) and finally washed with acetone to recover the product. The recovery rate for each compound was recorded in FIG. 4. The test compounds include polar and non-polar, acidic/basic/neutral compounds, water soluble/non-water soluble compounds which represent typical synthetic targets. Also 6 solvents were tested, which represent commonly used solvents in organic synthesis. The results showed an excellent recovery for most test compounds screened.

5. Capacity of Resin

Figure 5:
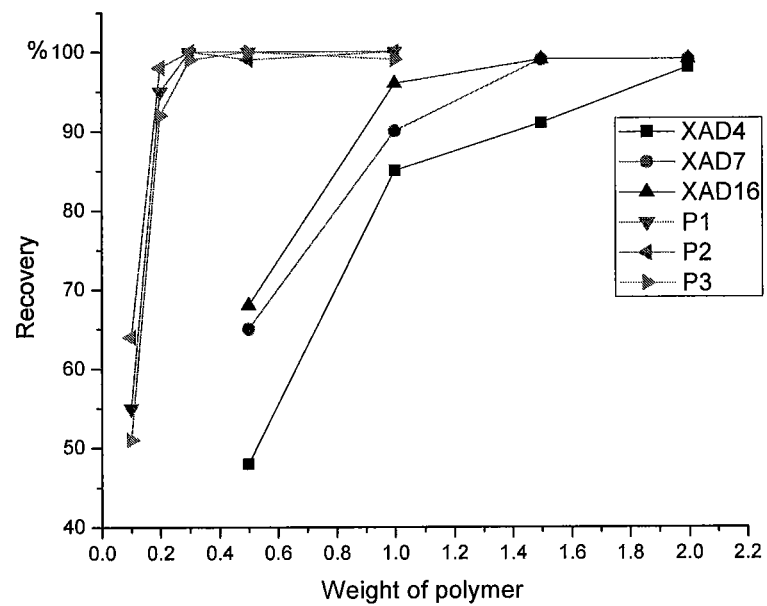
FIG. 5 is a graph showing the percent recovery of a known amount of compound 1 by various porous resins.

In order to determine the capacity of different commercial macroporous resins, we conducted a capacity test: certain amount of resin was added to a mixture of 100 mg of compound 1 (see FIG. 4) in 2 mL THF and 4 mL 10% NaCl solution (this is also a simulation of reaction mixture after quenching a reaction). After stirring for 20 minutes, the mixture was filtered and washed with water, then compound 1 was recovered by washing the resin with acetone. The recovery rate of compound 1 is shown in FIG. 5. From the results shown, it can be seen that XAD-16 has the best capacity, for samples containing 100 mg 1 in 2 mL THF, only 1 gram of resin is needed to reach >95% recovery, and when excess resin was used (≥2 g), all of them (XAD-4, XAD-7, XAD-16) give >95% recovery of compound 1. The bigger capacity of XAD-16 may be related to its larger pore volume (1.82 mL/gram), see FIG. 2. The synthesized poly-HIPEs have even much larger capacities. The recovery rate of compound 1 for the poly-HIPEs is also shown in FIG. 5.

Both macroporous polymers and poly-HIPEs have their advantage and disadvantages. The advantages of macroporous polymers are: a) cheap and commercially available; and b) good mechanic stability. The disadvantage is that its pore volume (normally 1-1.8 mL/g) is generally not large enough to hold large amount of solvents. The advantages of polyHIPEs are: a) the interconnected matrix enables liquids to flow through polymers, this minimizes diffusion effects normally found in conventional porous polymers and permits very high eluent flow rates. Resistance to flow is extremely low and mass transfer maybe fast; and b) large pore volumes enable greater holding capacity. PolyHIPE polymers can have porosities in excess of 90%, this means that loading cavities with large molecules such as enzymes can be easily accomplished. The disadvantages are: a) not commercially available; and b) mechanically less stable (can break more easily)

The above mentioned filtration based process is simple and practical, but for parallel synthesis it would be more convenient to use a flow-through technique by a using pre-packed column (cartridge). In certain embodiments, in a plastic container (shaped similar to a syringe) is placed a frit, polymer beads (resin), and another frit, which leaves room within the plastic container for a reservoir. In alternate embodiments, poly-HIPE beads (4-20 mesh, prepared by standard grinder and mesh set) were put into the plastic container with the protection of two frits, under a vacuum suction (around 20 mmHg) to ensure tight packing. The plastic container and fits are readily commercially available from Aldrich. By way of a specific example, this was done with P-2. Use of these work-up cartridges will make parallel chemistry work-up extremely easy. After the reaction is quenched, the reaction mixture is passed through the cartridge and the cartridge is washed with suitable aqueous scavenger to remove by-products (e.g. using basic solution to wash away acidic by-products); finally, the cartridges are washed with pure water. At the end, the cartridge is washed with pure organic solvents like ethanol or gradient of solvents (e.g. ethanol/water) to elute the product.

In a certain embodiment of the present invention, the cartridge may be used to isolate a target compound. As an example, the cartridge was used to isolate cholesterol from various organic acids and bases. Referring to FIG. 6, there is shown the chemical structure of cholesterol. A mixture of cholesterol and acids and based was dissolved in ether, 1 M HCl was added and the mixture was stirred for 5 minutes, then the whole mixture was passed through the reaction work-up cartridge. Next, the cartridge was washed with water, a NaOH solution and water again. Then, the cartridge was washed with ether to give the purified products. The NMR spectra of the mixture and purified product are shown in FIG. 6. It can be seen that after separation due to cartridge work-up, the almost pure product is isolated.

There is a considerable amount of time saving in reaction work-ups using this technology. Using flow-through technology, a typical reaction work-up needs less than 5-10 minutes (only simple filtration involved) with potentially higher recovery rate of the desired compounds. On the other hand, traditional aqueous work-up (using separation funnel) needs 30 minutes approximately, and if any emulsion is formed during phase separation, longer times are expected to finish the work-up. In addition, the rigid solvent extraction using flow-through technology is inherently easier to conduct in parallel synthesis, which will lead to even greater time and labor savings. Because all these operations are feasible for automation, human contact with potential toxic materials can be minimized. Finally, the work-up cartridges can be re-used without any problem if they are washed with acetone and water before each use.

In the above flow-through technology using a work-up cartridge, there is a need to transfer the reaction mixture to the work-up cartridge, which is easy when the reaction mixture is a clear solution. But this is not always the case in synthesis, if the reaction has any solid precipitates, it may complicate the liquid transfer, especially in automatic settings. A solution to the problem is to use an in situ extraction technology, such as an extraction plug. Polymer plugs have proved easier to handle compared to handling free-flowing polymer beads or particles. (Atrash, B.; Bradley, M.; Kobylecki, R Cowell, D.; Reader, J. Revolutionizing Resin Handling for Combinatorial Synthesis, *Angew. Chem., Int. Ed.* 2001, 40, 938; Bouillon, I.; Soural, M.; Krchnak, V. Resin capsules: Permeable containers for parallel/combinatorial solid-phase organic synthesis, *J. Comb. Chem.* 2008, 10, 714; Najman, R.; Cho, J. K.; Coffey, A. F.; Davies, J. W.; Bradley, M. Entangled palladium nanoparticles in resin plugs, *Chem. Commun.* 2007, 5031; Koc, F.; Michalek, F.; Rumi, L.; Bannwarth, W.; Haag, R. Catalysts on functionalized polymer chips (PC) as recyclable entities, *Synthesis-Stuttgart* 2005, 3362). In a certain embodiment, a polyHIPE monolith type polymer is shaped as an extraction plug. Then, after the reaction was quenched, the extraction plug was inserted into reaction mixture directly, and after stirring, this plug was washed by water and then organic solvent to recover the product. In an experiment similar to that discussed above, for which the results are shown in FIG. 6, the recovery rate for cholesterol also reached >90%.

Figure 7:
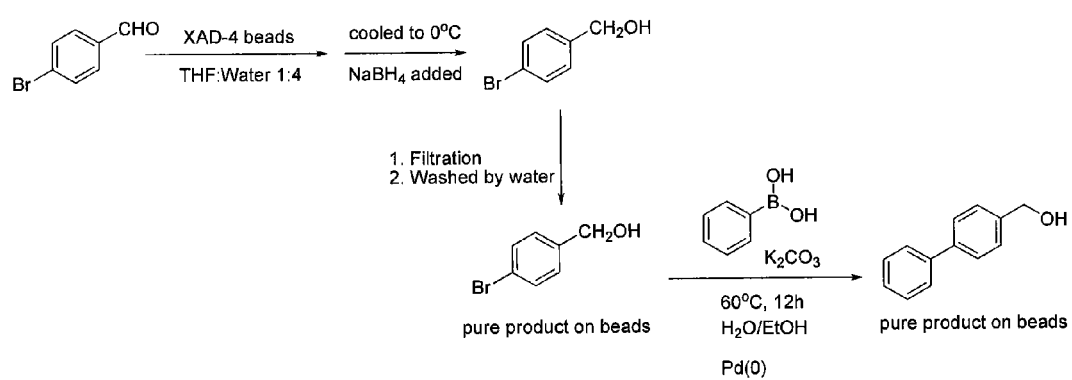
FIG. 7 is a schematic diagram of an embodiment of the present invention in the synthesis of biphenyl-methyl alcohol.

The invention disclosed herein allows for chemical reactions to take place in the resin. In a certain embodiment of the invention, supported synthesis of biphenyl-methyl alcohol is shown in FIG. 7. In still other embodiments, XAD-4 supported organic phase is used as reaction media. Still referring to FIG. 7, para-Bromobenzaldehyde (0.5 mmol) was added to 3 mL THF:water mixture, then XAD-4 beads (500 mg) was added and the reaction mixture was cooled to 0° C., then $NaBH_4$ (0.6 mmol) was added. After stirring for 30 minutes, the reaction mixture was filtered and washed with water. In this manner the pure benzyl alcohol product-supported XAD beads are obtained. The supported beads can be used in the next step without further purification. The reaction process is easily monitored by TLC or NMR (simply wash several beads with acetone to check TLC or wash several beads with d-acetone to run a NMR spectrum). Still referring to FIG. 7, the product-supported XAD beads were added to a solution of phenyl boric acid (0.8 mmol) and $K_2CO_3$ (1.0 mmol) in water: ethanol (2:1) solution; then $Pd(PPh_3)_4$ (0.01 mmol) was added and the reaction mixture was heated to 60° C. for 12 h. Then the reaction mixture was filtered and washed with water, and the beads were washed with acetone to give the final biphenyl-methyl alcohol product.

In addition to simple reactions like reduction, and oxidation, FIG. 9 shows a list of other reactions that may be facilitated by the invention disclosed herein. It is not a comprehensive list. In certain embodiments of the invention, such embodiments will use the following protocol. The starting material, catalyst and polymer support are mixed, and then a small amount of co-solvent is added, followed by water. The mixture is stirred for a given time at certain temperature. The progress of the reaction can be monitored by TLC or NMR analyses (wash several beads with acetone to check TLC or wash several beads with d-acetone to run a NMR experiment). After the reaction is complete, the mixture is filtered, washed with water, and eluted with acetone or ethanol to give the product, as described elsewhere herein. In certain embodiments, the type of polymer resin, type of solvent (ethanol, THF, toluene, etc), and solvent amounts may be altered to achieve desired chemical yields.

II. Method of Use of Polymric Adsorbent Resin as a Catalyst

Catalysts play a significant role in the production of chemicals today. While heterogeneous catalysts are general reusable, they generally have much less activity compare to homogeneous catalysts. Nanomaterials have the potential for improving the efficiency. The higher surface to volume ratio means that much more of the catalyst is actively participating in the reaction, which leads to higher activity. But for nanoparticles catalysis, unsupported nanoparticles in solution (as a colloid) usually is not a good option, because it will be difficult to recycle the catalyst without aggregations of nanoparticles. Those nanoparticles generally need strong solid supports to facilitate recovery of nanoparticles and also prevent aggregation of nanoparticles.

Usually nanoparticle catalysts are prepared from a metal salt, a reducing agent, and a stabilizer, and are supported on an oxide, charcoal, or a zeolite. In addition to the standard polymers and oxides used, innovative stabilizers, media, and supports have appeared, such as dendrimers, specific ligands, ionic liquids, surfactants, membranes, carbon nanotubes, and a variety of oxides. Use of nanoparticle catalysis in chemical synthesis, for example, in hydrogenation and C—C coupling reactions, and heterogeneous oxidation have attracted much attention. (Corma, A.; Garcia, H. *Supported gold nanoparticles as catalysts for organic reactions. Chem. Soc. Rev.* 2008, 37, 2096-2126; Glaspell, G.; Hassan, H. M. A.; Elzatahry, A.; Fuoco, L.; Radwan, N. R. E.; El-Shall, M. S. *Nanocatalysis on Tailored Shape Supports: Au and Pd Nanoparticles Supported on MgO Nanocubes and ZnO Nanobelts. J. Phys. Chem. B* 2006, 110, 21387-21393; Hughes, M. D.; Xu, Y.-J.; Jenkins, P.; McMorn, P.; Landon, P.; Enache, D. I.; Carley, A. F.; Attard, G. A.; Hutchings, G. J.; King, F.; Stitt, E. H.; Johnston, P.; Griffin, K.; Kiely, C. J. *Tunable gold catalysts for selective hydrocarbon oxidation under mild conditions. Nature* 2005, 437, 1132-1135; Turner, M.; Golovko, V. B.; Vaughan, O. P. H.; Abdulkin, P.; Berenguer-Murcia, A.; Tikhov, M. S.; Johnson, B. F. G.; Lambert, R. M. *Selective oxidation with dioxygen by gold nanoparticle catalysts derived from 55-atom clusters. Nature* 2008, 454, 981-983).

In certain embodiments of the present invention, a nanoparticle catalyst is incorporated into the macroporous resin. It is believed that the organic porous polymer supported organic phase would be an ideal reaction media and that the incorporation of nanoparticles would make it even more attractive in chemical synthesis. It is believed that the presence of 'rigid solvent' around the nanoparticles will make it more stable and less likely to aggregate under harsh reaction conditions like high temperature. Because the catalysis will happen inside the polymer support/bead, each polymer bead will behave like a microreactor.

1. Preparation of Porous Organic Solid Supported Metal Nanoparticles.

In certain embodiments of the invention, many organic reducing reagents can be absorbed by a resin like XAD-4 and can penetrate the bead. Those reducing reagents can react with water-soluble metal salts (such as $PdCl_2$, $NaAuCl_4$, etc.) in the presence of $Bu_4NCl$ as a metal source, and the metal salt can then be reduced to metal nanoparticles. The strong macroporous structure of XAD will be an excellent solid support to prevent aggregation of metal nanoparticles and maintain their activity.

The following sentence shows the step for preparing XAD-4 supported nano-gold particles.

As shown therein, a terminal alkyne (0.5 mmol) was dissolved in 4 mL methanol, then 1.0 g XAD-4 resin was added. After stirring for 10 minutes, 20 mL water was added, and the reaction mixture was stirred for another 30 minutes. A solution of $NaAuCl_4$ (0.05 mmol) in 2 mL water was added slowly during stirring, then the reaction mixture was stirred for another 3 hours, and the reaction mixture was filtered and washed with water, methanol and then acetone successively, as know to those of ordinary skill in the art. The supported XAD-4 beads were dried in vacuum to give supported gold nanoparticles.

The following sentence shows the step for preparing XAD-4 supported nano-palladium particles:

As shown, $Et_3SiH$ (0.5 mmol) was dissolved in 2 mL ethanol, then 1.0 g XAD-4 resin was added. After stirring for 10 minutes, 20 mL water was added, and the reaction mixture was stirred for another 30 minutes. A solution of $PdCl_2$ (0.05 mmol) in 2 mL 1% $Bu_4NCl$ solution was added slowly during stirring, then reaction mixture was stirred for another 3 hours, and the reaction mixture was filtered and washed with water, ethanol and then acetone, as known to those of ordinary skill in the art. The filter cake was dried in vacuum give supported palladium nanoparticles. Similarly, palladium nanoparticles were prepared using Amberlite A-26 resin.

2. Catalyzed Suzuki Reaction

Figure 8:
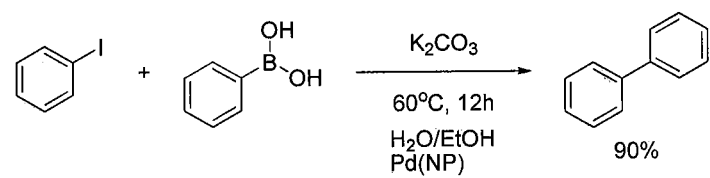
FIG. 8 is a schematic diagram of the Suzuki reaction, which is commonly used in the pharmaceutical industry.
Figure 10:
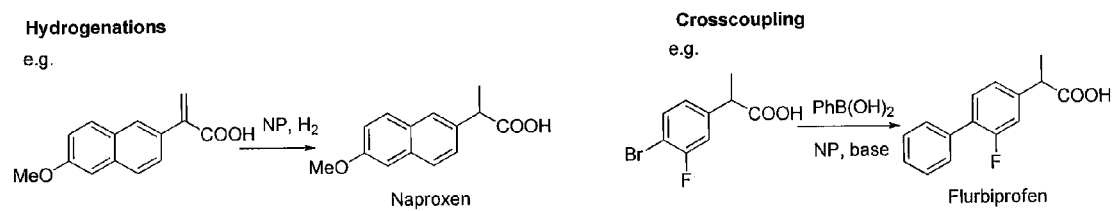
FIG. 10 is a schematic diagram of an embodiment of the present invention for hydrogenation and cross-coupling reactions.

After obtaining the supported metal nanoparticles, the catalytic activity was examined using a very popular cross coupling reaction—Suzuki reaction, which is commonly used in the pharmaceutical industry, as shown in FIG. 8. Still referring to FIG. 8, Iodobenzene (0.5 mmol), phenyl boric acid (0.8 mmol) and $K_2CO_3$ (1.0 mmol) were added to a 4 mL mixture of a water:ethanol (1:1) solution. Then, the supported nano-Pd on XAD-4 (100 mg) was added, and the reaction mixture was heated to 60° C. for 12 hours. The supported catalyst was recovered by filtration, and the filtrate was extracted by ether. The evaporation of ether furnished the crude product, which was purified by regular flash column chromatography, as known to those of ordinary skill in the art, to yield pure biphenyl in 90% yield. The supported metal nanoparticles could be reused three times without significant activity loss.

In yet another embodiment of the present invention, the organic reducing reagent (0.5 mmol) is dissolved in 1 mL co-solvent (preferably a water soluble solvent), then 1.0 g of solid support is added. After stirring for 10 minutes, 20 mL water is added, and the reaction mixture is stirred for another 30 minutes. A solution of metal salt (0.05 mmol in 2 mL water) is added slowly during stirring, and the reaction mixture is stirred for another 3 hours, after which the reaction mixture is filtered and washed successively with water, methanol, and acetone. The polymer beads are dried in vacuum to give supported metal nanoparticles. The particle distribution can be determined by TEM or other analytical methods.

As stated above, macropolymer resin (solid supports) can be commercial or synthesized porous polymers. A co-solvent can be ethanol, methanol, THF, acetonitrile ether etc. Metal salts can be salts of Pd, Pt, Au, Ru etc. The reducing reagent can be alkynes, phenols, formaldehyde, silanes, etc.

In still other embodiments of the present invention, catalysis of hydrogenation and cross-coupling reactions may be achieved. Such reactions are best seen in FIG. 9. However, leaching of trace metals into the product is an unwanted problem in the pharmaceutical industry, although standard methods like ICP-MS exist to test for metals like Pd. In certain embodiments, the catalyst is reusable.

The obtained supported nanoparticles would be ideal replacements to widely used supported catalyst systems like Pd/C or Pt/C. Our supported nanoparticles are more defined (more uniform particle size) and much easier to handle (free flowing particles). And potentially they are expected to be less prone to leaching (particles are located inside the support). In addition, they can be made at low cost. The supported nanoparticles may be used as recoverable catalysts in a wide range of synthesis and in other non-synthetic uses (sensors, medicine, etc.) yet to be determined.

III. Method of Use of Silica Gel

Regarding the use of silica gel, the starting materials for the methodology disclosed herein are readily commercially available. The methodology disclosed herein allows for an improvement to the efficiency of chemical synthesis due to the ability to combine the reaction step with the chromatography step. More specifically, the method allows for catalysts or reagents to be immobilized in a chromatographic stationary phase, like silica gel. In alternate embodiments, the chromatographic solid support may be reversed phase silica gel, sephadex, or the like. That material is then placed in a column for use. Then, chemical reactions and chromatography are performed by applying the appropriate material to the top of the column, as is normally the case in regular flash column chromatographic purification. Accordingly, the type of silica gel to be used is that used with flash chromatography. A suitable organic solvent is used to elute the column, such that the material will move through the column and will react with the catalysts or reagents that have been immobilized. As a final step, the resulting product may be collected.

Improvement to the efficiency of synthesis results from the combination of reaction and chromatographic purification into a single step. More specifically, i) catalysts or reagents are immobilized in a chromatographic stationary phase like silica gel, and the supported silica is used to pack a column; ii) the starting material is applied to the top the column just like a regular flash column chromatographic purification; iii) then a suitable organic solvent is used to elute the column, the starting material will move along the column and will react with supported reagents, or catalyzed by the supported catalysts; and iv) monitor the flow and collect the product. In this way the reaction actually will happen at the surface of this stationary phase through an adsorption/desorption process, then the reaction/separation will occur simultaneously. This will reduce a large fraction of the labor involved and it has the potential to fulfill the automation dream of synthetic chemists.

1. Immobilization of Catalysts/Reagents on Silica Gel.

Regarding polarity based absorption, because the silica surface is highly polar due to the free silanol, reagents or catalysts with high polarity will easily absorbed to silica and will not be eluted by most organic solvents. Examples include, but are not limited, to the following: (i) Oxidants: $KMnO_4$, $Fe(NO_3)_3$, $Bu_4N^+RuO_4^-$, Pyridinium chlorochromate (PCC) etc.; (ii) Reductants: $NaBH_3CN$ etc.; (iii) Acids: TsOH, $H_2SO_4$, $H_3PO_3$ etc.; (iv) Bases: NaOH, KOH, $K_2CO_3$ etc.; (v) Nucleophiles: $Bu_4N^+N_3^-$ etc.; and (vi) Transition metal catalysts: $NaAuCl_4$, $Pd(OAc)_2$ $RuCl_3$ etc.

Another way to immobilize the reagents/catalysts to silica surface is by conversion of the desired reagents/catalysts to supported fine particles like nanoparticles. In this way, the catalyst/reagent will not be eluted by the solvent. Nanomaterials have the potential for high efficiency due to their higher surface to volume ratio, which often means that much more of the catalyst is actively participating in the reaction than big particles. At the same time, supported catalytic nanomaterials will lead to easier recovery of catalysts compared to homogeneous catalysis. For example, recently, supported gold nanoparticles have been used in catalysis. Noble metals supported on high-surface area active carbons like Pd/C are among the most widely used metallic catalysts and are widely used to promote hydrogenations and oxidations among other general reaction types. Silica gel supported nanoparticles are also expected to have good activity.

In certain embodiments of the present invention, the following results in the preparation of 10% (w/w) silica supported oxidant (PCC). Pyridinium chlorochromate (PCC) (10 g) was dissolved in acetone 100 mL, and during stirring, 100 g silica gel was added, after the mixture was stirring for 20 minutes, the acetone was removed in vacuum; a yellow free flowing solid was obtained (110 g).

In certain embodiments of the present invention, the following results in the preparation of 0.5% (w/w) silica supported catalyst $NaAuCl_4$, $NaAuCl_4$ (50 mg) was dissolved in methanol 10 mL, and during stirring, 10 g silica gel was added, after the mixture was stirring for 20 min, the methanol was removed in vacuum; a pale yellow free flowing solid was obtained (10 g).

In certain embodiments of the present invention, the following results in the preparation of 0.5% (w/w) silica supported catalyst Au Nanoparticles.

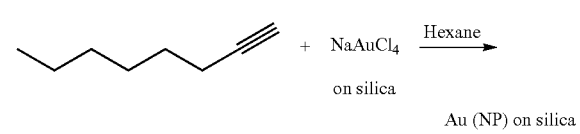

The 0.5% (w/w) silica supported catalyst $NaAuCl_4$ prepared in the paragraph above was added to 20 mL hexane, with stirring, 100 mg oct-1-yne was then added; after stirring for 12 hours, the mixture was filtered and washed with hexane and then methanol, the solid was dried in vacuum give supported Au nanoparticles in silica gel.

In certain embodiments of the present invention, the following results in the preparation of supported oxidation of alcohol.

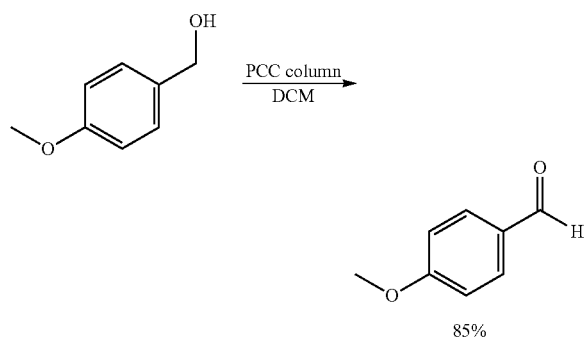

For best control of flow rate, a system similar to a MPLC was used. Five grams of supported PCC (prepared as described above) was packed into a 1 cm-diameter chromatography column (omni-fit column, from Bio-Chem Fluidics Inc.), then 100 mg of benzyl alcohol was applied through an injection valve to pre-packed column, then the column was eluted by dichloromethane, the collected fractions were checked by TLC or UV detection, and the fraction containing the product was concentrated to yield the pure aldehyde product in 85% yield. In certain embodiments of the present invention, the following results in the preparation of supported cyclization of alkynyl acid.

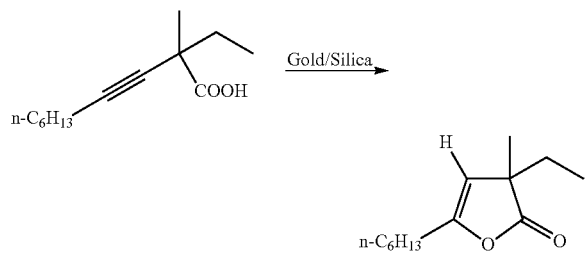

For best control of flow rate, a system similar to a MPLC was used. Five grams supported 0.5% (w/w) silica supported catalyst $NaAuCl_4$ (prepared as described above) was packed into the 1 cm diameter flash chromatography column (omni-fit column, from Bio-Chem Fluidics Inc.), then 100 mg alkynyl acid was applied through an injection valve to the flash column, then the column was eluted by dichloromethane, the collected fractions were checked by TLC or UV detection, and the fraction containing the product was concentrated to furnish the pure lactone product in quantitative yield.

Along the same lines of the Au(0), Au(I) and Au(III) on silica gel support, in certain embodiments of the invention, use of noble metal based catalyst systems like Pd(0), $PdCl_2$, Pt(0), $PtCl_2$ and $AgNO_3$ may be used. Further, other common chromatographic stationary phases, such as reverse phase silica, sephadex, fluorisil, or even some chiral stationary phases may be used.

Figure 11:
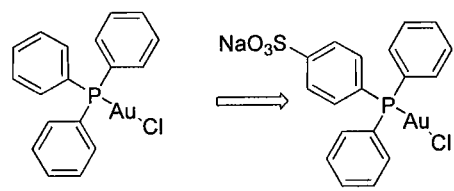
FIG. 11 is a schematic diagram showing the modification of a known catalyst.
Figure 12:
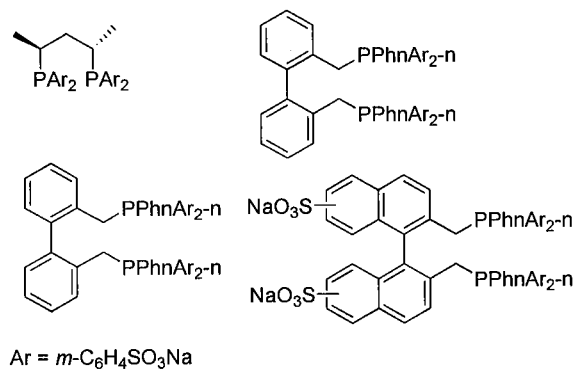
FIG. 12 is a listing of highly polar hydrophilic ligands.

It is noted that not all the reagents/catalysts are polar enough to be adsorbed strongly by the silica surface. That said, modified versions of an existing catalysts/reagents may be used by attaching polar groups to them. For example, triphenylphosphine gold(I) chloride is a very common gold catalyst which has only moderate polarity. However, attachment of a —$SO_3Na$ group to its one or more phenyl rings will make it much more polar and immobilized by the silica surface, as seen in FIGS. 11 and 12. Wide range of highly polar hydrophilic ligands are commercially available or can be easily synthesized.

When making supported nanomaterials, two methods may be used: adsorption and deposition—precipitation. Basic characterization of the supported nanoparticles may be accomplished by a combination of different experimental techniques. For example, TEM allows determining the shape and particle size distribution of the nanoparticles and their location. XPS and FT-IR may be used to establish the metal oxidation states. These techniques are know to those of ordinary skill in the art. In addition to the reactions discussed above, the present invention is relevant to the chemical reactions shown in FIG. 13 in order to show the effects of the supported systems. These are common reactions used in synthesis, like hydration of alkynes (eq 2), cyclization of allenyl acid (eq 3) and cycloisomerizations of enyne (eq 4).

2. In Situ Separation During Reaction

Figure 13:
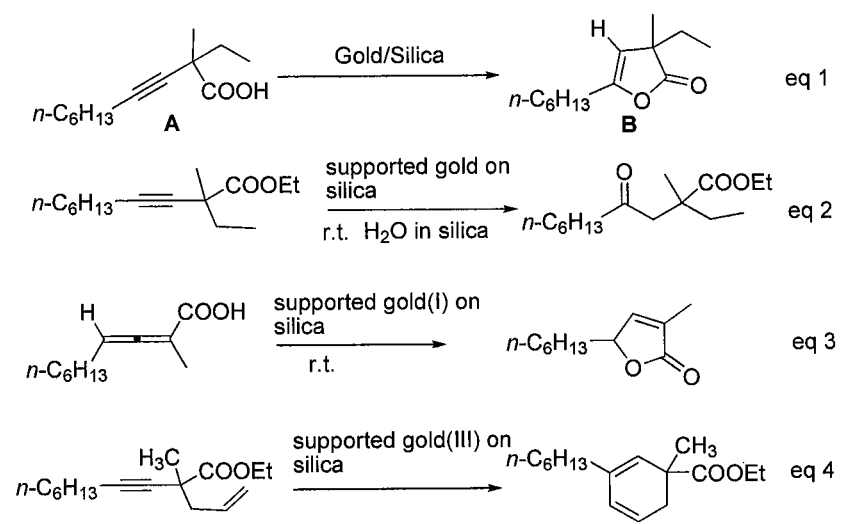
FIG. 13 is an exemplary list of common reactions used in synthesis, like hydration of alkynes (eq 2), cyclization of allenyl acid (eq 3) and cycloisomerizations of enyne (eq 4).

By using supported silica gel as reaction media, there is the opportunity to combine reaction and separation in a single step. Referring now to FIG. 13, as shown in eq 1, the product B is less polar than starting material A. When reaction solution passes through the column, product B will move faster than acid A, so even if the reaction is slow, it will result in obtaining pure B without contamination of starting material A. When the compounds react during their movement through the column, it may cause broadening of the chromatographic peak and reduce the effect of purification. That said, several of the following technologies could be used to improve the purification: (i) Recycling: the outlet flow can be reintroduced to inlet of column. With several passes, the purification may improve. If the reaction is not complete, this method also can be used to increase conversion of reaction; (ii) Reverse flow: if product is highly polar, after certain time, reverse flow can be used to wash it out; and (iii) Use of gradient elution.

As described above, the reactions on the cartridges provide an opportunity to do reaction and purification at the same time. Other advantages over traditional reaction in flasks or reaction vials include: (i) the column containing supported expensive transition metal catalysts would be easily recovered using polar solvents (like ethyl acetate or methanol for silica gel) by washing away all the by-products or impurities; (ii) reaction temperature can be above the solvent's boiling point due to the column's ability to contain pressure; (iii) mixing can be achieved within seconds at the smaller scales used in flow chemistry; (iv) the thermal mass of the fluid is typically far lower than the thermal mass of the column system (so overheating is unlikely), which makes controlling the temperature of the media both faster and easier ensuring that exothermic and endothermic process can be conducted without disruptions; and (v) multi-step reactions can be arranged in a continuous sequence which can be especially beneficial if intermediate compounds are unstable.

EXAMPLES

Example 1

Method of Purification

In certain embodiments, the following process was used to purify test compounds from mixtures of known amounts of such test compounds which were dissolved in various solvents, as further described herein. The results of use of the following protocol for various test compounds is provided in FIG. 4. 80 milligrams (80 mg) of a test compound was dissolved in 1 ml of an organic solvent. The identity of each test compound and organic solvent is indicated in the following table. Also added to that mixture was 4 ml of 20% NaCl solution. To that mixture was added to 2 grams of XAD-4 resin, which is widely commercially available as described above, or from Rohm and Haas, a subsidiary of the Dow Chemical Company, Philadelphia, Pa. XAD-4 is a polymeric adsorbent. Such polymeric adsorbents are highly porous structures with internal surfaces that can adsorb and then desorb a wide variety of entities. After stirring for 20 minutes, the mixture was filtered with a porosity M filter, commercially available from Chemglass, in Vineland, N.J., as part number CG-1406-47. Filtration was to collect the resin. The collected resin was washed with about 30 ml of water. The resin was then washed with about 40 ml of acetone in order to dislodge the test compound from the resin. The recovery rate for each compound is shown in the table below. By way of background, the shown test compounds include a variety of entities, including polar, non-polar, acidic, basic, neutral, water soluble and non-water soluble compounds. These compounds represent typical synthetic targets. Also, six different solvents were tested. The solvents represent commonly used solvents in organic synthesis.

Although the structure of each test compound is shown in FIG. 4, the names are:
1. N-Phenylmaleimide
2. diacetone-D-glucose
3. 2,6-dihydroxybenzoic acid
4. Ferrocene
5. 2,6-dibromoaniline Still referring to FIG. 4, the following are the full names for the abbreviations shown in the figure: Tetrahydrofuran (THF), Ethanol (EtOH), Acetonitrile ($CH_3CN$), Dicholoromethane ($CH_2Cl_2$), and N,N-Dimethylformate (DMF).

Example 2

Method of Use of Polymeric Adsorbent Resin in a Chemical Reaction

Para-bromobenzaldehyde (0.5 mmol), which is widely commercially available, was added to 3 ml of tetrahydrofuran (THF), that mixture was then added to a water mixture. At that point XAD-4 resin (500 mg) was added to the mixture and was cooled to 0° C., then $NaBH_4$ (0.6 mmol) was added. After stirring for thirty minutes, the mixture was filtered with a porosity M filter, commercially available from Chemglass, in Vineland, N.J., as part number CG-1406-47. Filtration was to collect the resin. The collected resin was washed with water. The collected resin was added to a solution of phenyl boric acid (0.8 mmol) and $K_2CO_3$ (1.0 mmol) in a water/ethanol (2:1) solution. Next, $Pd(PPh_3)_4$ (0.01 mmol) was added and the reaction mixture was heated at 60° C. for 12 hours. Next, the mixture was filtered and washed with water, as above. The collected resin was washed with about 40 ml of acetone in order to dislodge the product which is biphenyl-methyl alcohol.

Example 3

Method of Use of Polymeric Adsorbent Resin as a Catalyst

The preparation of a reusable catalyst requires the initial step of preparing a polymeric adsorbent resin combined with nano-palladium particles. As shown below, $Et_3SiH$ (0.5 mmol) was dissolved in 4 mL methanol, then 1.0 gram XAD-4 resin was added. After stirring for 10 minutes, 20 mL of water was added, and the reaction mixture was stirred for another 30 minutes. A solution of $PdCl_2$ (0.05 mmol) in 2 mL 1% NaCl solution was added slowly during stirring, then the reaction mixture was stirred for another 3 hours. At that point, the reaction mixture was filtered, as described in Example 2, to collect the resin, and washed with 30 ml of water, 40 ml of methanol and then 40 ml acetone. The filter cake was dried in vacuum to provide the resin supported palladium nanoparticles. In alternate embodiments of the present invention, synthesis of nano-platinum particles, or other metals, may be desired.

Preparation of XAD-4 resin supported nano-palladium particles:

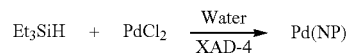

The following is an alternate method of preparing the reusable resin combined with nano-palladium particles. As shown below, $Pd(PPh_3)Cl_2$ (0.1 mmol) was dissolved in 4 mL THF, then 1.0 gram of XAD-4 resin was added. After stirring for 10 minutes, the solvent was removed in vacuum slowly. At that point, 20 mL water was added, and the reaction mixture was stirred for another 30 minutes. Then, $NaBH_4$ (0.2 mmol) was added, slowly during stirring, and the reaction mixture was stirred for another 3 hours. The reaction mixture was filtered, as above, and washed with water, methanol and then acetone, as above. The filter cake was dried in vacuum to provide the resin supported palladium nanoparticles.

Preparation of XAD-4 resin supported nano-palladium particles:

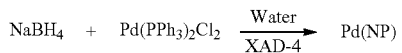

Example 4

Method of Use of Silica Gel

Provided herein are examples of methods of making silica gel supported oxidants and catalysts. Further examples of the use of silica gel are provided elsewhere in this application. The preparation of 10% (w/w) silica supported oxidant, pyridinium chlorochromate (PCC), resulted from 10 grams of PCC being dissolved in 100 mL of acetone. During stirring, 100 grams of silica gel, which is readily commercially available, was added and was stirred for 20 minutes. The acetone was removed by vacuum, which resulted in a yellow colored free flowing solid (110 grams). Methods of using the product are further described elsewhere in this application.

Regarding the preparation of a silica gel supported catalyst, the following is the preparation of a 0.5% (w/w) silica supported catalyst $NaAuCl_4$. $NaAuCl_4$ (50 mg) was dissolved in methanol (10 mL), and during stirring, 10 grams of silica gel was added. After the mixture was stirred for 20 minutes, the methanol was removed by vacuum, which resulted in a pale yellow colored free flowing solid (10 g). Methods of using the product are further described elsewhere in this application.

This patent application expressly incorporates by reference all patents, references, and publications disclosed herein. All documents cited or referenced herein, and all documents or all documents cited or referenced in such documents, together with any manufacturer's instructions, descriptions, product specifications and product sheets for any products mentioned herein or in any document incorporated by reference herein, are hereby incorporated herein by reference, in their entirety and may be employed in the practice of the invention.

Although the present invention is described herein in terms of specific embodiments, it is anticipated that alterations and modifications thereof will no doubt become apparent to those skilled in the art. It is therefore intended that the claims be interpreted as covering all alterations and modifications that fall within the true spirit and scope of the invention.

What is claimed is:

1. A method of purifying a product, the method comprising:
   contacting a resin with a mixture comprising an aqueous solution, the product, and an organic solvent, wherein the organic solvent enters the pores of the resin and some of the product is dissolved in the organic solvent;
   adding a water-based solution to remove one or more unwanted by-products;
   optionally, adding water to remove or dilute the water-based solution; and
   adding a dislodging solvent to dislodge the product from the resin,
   where (a) the mixture is a two phase mixture, (b) the resin is a high internal phase emulsion polymeric (polyHIPE) resin which is prepared from polymerization of an emulsion of an aqueous phase and an oil phase comprising divinylbenzene and sorbitan monooleate, and (c) the resin has a pore volume of more than 1.8 ml/g.

2. The method of claim 1, wherein the resin has a pore volume of more than 5 ml/g.

3. The method of claim 1, wherein the resin has a pore volume of from about 1.8 ml/g to about 25 ml/g.

4. The method of claim 1, wherein the resin is in a capsule, in a column, or in a plug.

5. The method of claim 1, wherein the contacting is mixing or the contacting is passing the mixture through the resin in a column.

6. The method of claim 1, wherein the resin is polyHIPE resin P-1 which is prepared from polymerization of an emulsion of 5 mL divinylbenzene, 5mL toluene, and 2 mL sorbitan monooleate in 90 mL water, polyHIPE resin P-2 which is prepared from polymerization of an emulsion of 2 mL divinylbenzene, 8 mL toluene, and 3 mL sorbitan monooleate in 90 mL water, or polyHIPE resin P-3 which is prepared from polymerization of an emulsion of 9 mL divinylbenzene and 3 mL sorbitan monooleate in 90 mL water.

7. The method of claim 1, wherein the aqueous solution is selected from the group consisting of water, NaCl in water, and a solution used to quench a reaction.

8. The method of claim 1, wherein the organic solvent is selected from the group consisting of tetrahydrofuran, ethanol, toluene, dichloromethane, acetonitrile, dimethylformamide, and acetone.

9. The method claim 1, wherein the step of adding water is not optional.

10. The method of claim 1, wherein the mixture is a reaction mixture.

11. The method of claim 1, wherein the water-based solution is selected from the group consisting of an acidic aqueous solution, a basic aqueous solution, water, an aqueous solution comprising sodium bisulfate ($NaHSO_3$), a reducing aqueous solution, an aqueous solution comprising chelation reagents, and mixtures thereof.

12. The method of claim 1, wherein the one or more unwanted by-products is selected from the group consisting of basic organic compounds, acidic organic compounds, aldehydes, oxidizing agents, metals, and mixtures thereof.

13. The method of claim 1, wherein the dislodging solvent comprises acetone, ethanol, or an ether.

14. The method of claim 1, wherein the percent recovery of the product is at least about 95%.

15. The method of claim 1, wherein the percent recovery of the product is at least about 90%.

16. The method of claim 1, wherein the percent recovery of the product is at least about 85%.

17. The method of claim 1, wherein the amount of time to perform the method is less than or equal to about 20 minutes.

18. The method of claim 1, wherein the amount of time to perform the method is less than or equal to about 10 minutes.

19. The method of claim 1, wherein the amount of time to perform the method is less than or equal to about 5 minutes.

20. A method of extracting a product, the method comprising:
   contacting a resin with a mixture comprising an aqueous solution, the product, and an organic solvent, wherein the organic solvent is in the pores of the resin and some of the product is dissolved in the organic solvent;
   adding a water-based solution to remove one or more unwanted by-products;
   optionally, adding water to remove or dilute the water-based solution; and
   adding a dislodging solvent to dislodge the product from the resin, where (a) the mixture is a two phase mixture, (b) the resin is a high internal phase emulsion polymeric (polyHIPE) resin which is prepared from polymerization of an emulsion of an aqueous phase and an oil phase comprising divinylbenzene and sorbitan monooleate, and (c) the resin has a pore volume of more than 1.8 ml/g.

21. A method of purifying a product, the method comprising:
   contacting a resin with a mixture comprising an aqueous solution, the product, and an organic solvent;
   optionally, adding a water-based solution to remove one or more unwanted by-products;
   optionally, adding water to remove or dilute the water-based solution; and
   adding a dislodging solvent to dislodge the product from the resin, where (a) the mixture is a two phase mixture, (b) the resin is a high internal phase emulsion polymeric (polyHIPE) resin which is prepared from polymerization of an emulsion of an aqueous phase and an oil phase comprising divinylbenzene and sorbitan monooleate, and (c) the resin has a pore volume of more than 1.8 ml/g.

22. A method of purifying a product, the method comprising:
   contacting a resin with an organic solvent, wherein the organic solvent enters the pores of the resin to make a supported organic phase (SOP);
   contacting the SOP with a composition comprising an aqueous solution and the product, wherein some of the product is dissolved in the organic solvent of the SOP;
   adding a water-based solution to remove one or more unwanted by-products;
   optionally, adding water to remove or dilute the water-based solution; and
   adding a dislodging solvent to dislodge the product from the SOP, where (a) the resin is a high internal phase emulsion polymeric (polyHIPE) resin which is prepared from polymerization of an emulsion of an aqueous phase and an oil phase comprising divinylbenzene and sorbitan monooleate and (b) the resin has a pore volume of more than 1.8 ml/g.

* * * * *